April 21, 1953   T. L. COOK ET AL   2,635,776
MACHINE FOR APPLYING LABELS TO THE SIDES OF ARTICLES
AS THEY ARE MOVED ON THEIR ENDS THROUGH THE MACHINE
Filed March 24, 1950   5 Sheets-Sheet 1
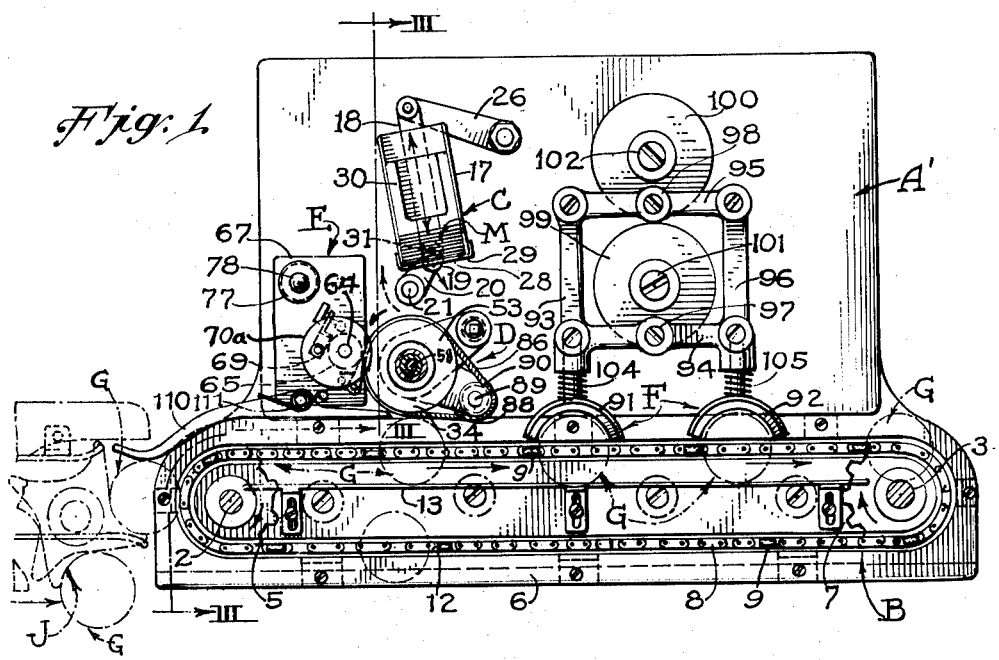
Fig. 1
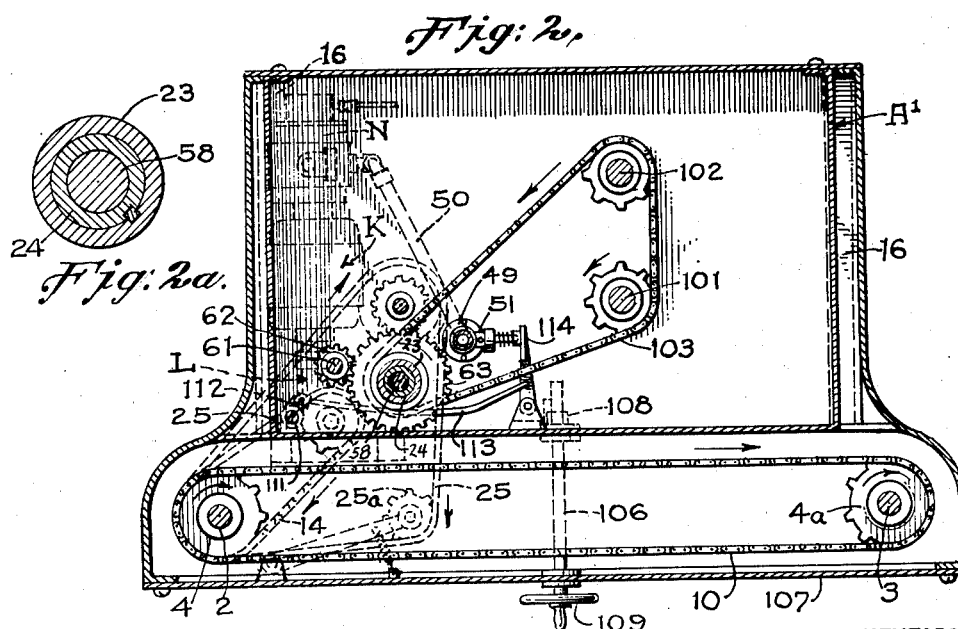
Fig. 2
Fig. 2a
INVENTORS
Thomas L. Cook
BY Ashley J. Hollingsworth
Munn, Liddy & Glaccum
ATTORNEYS.

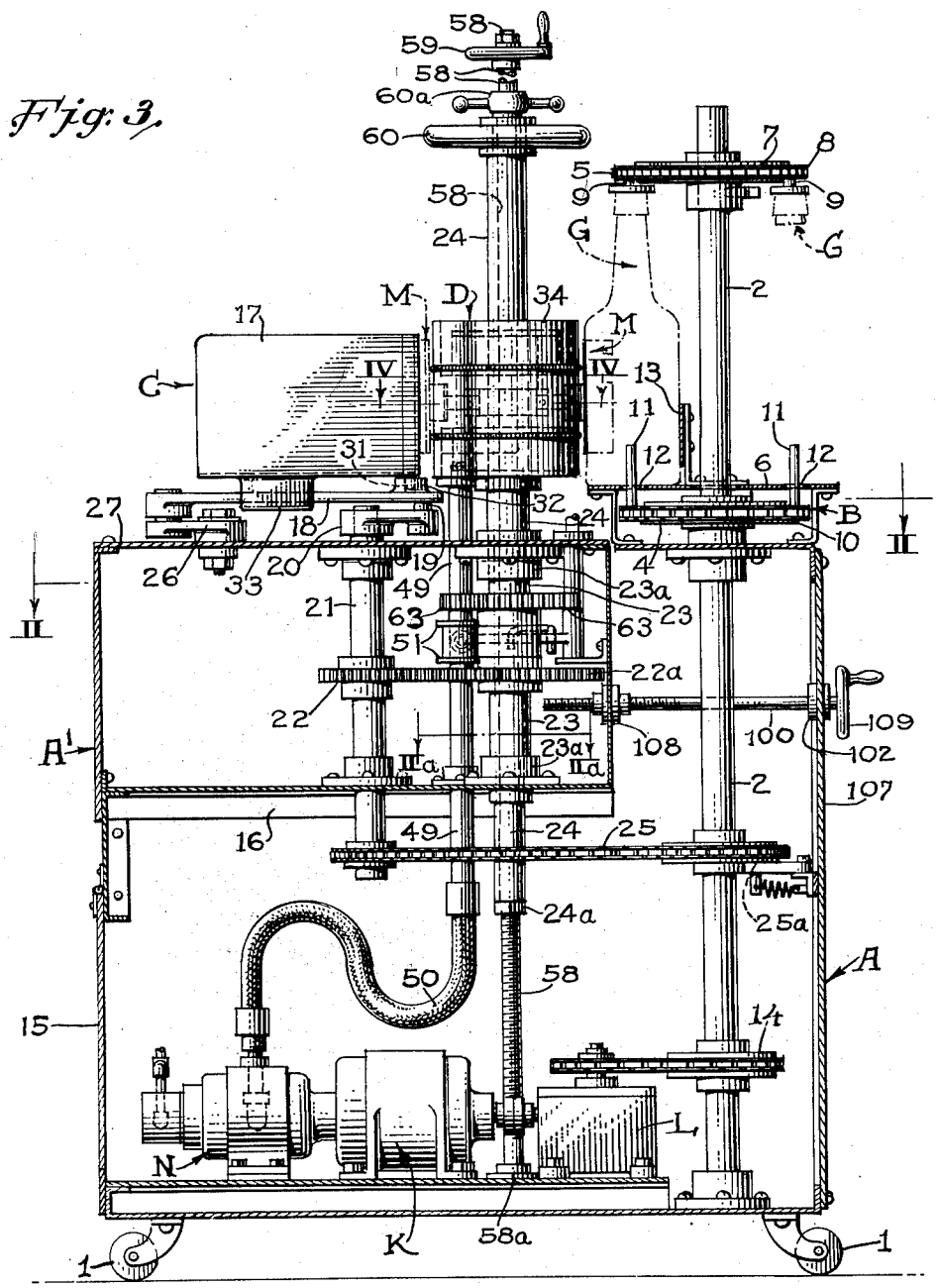

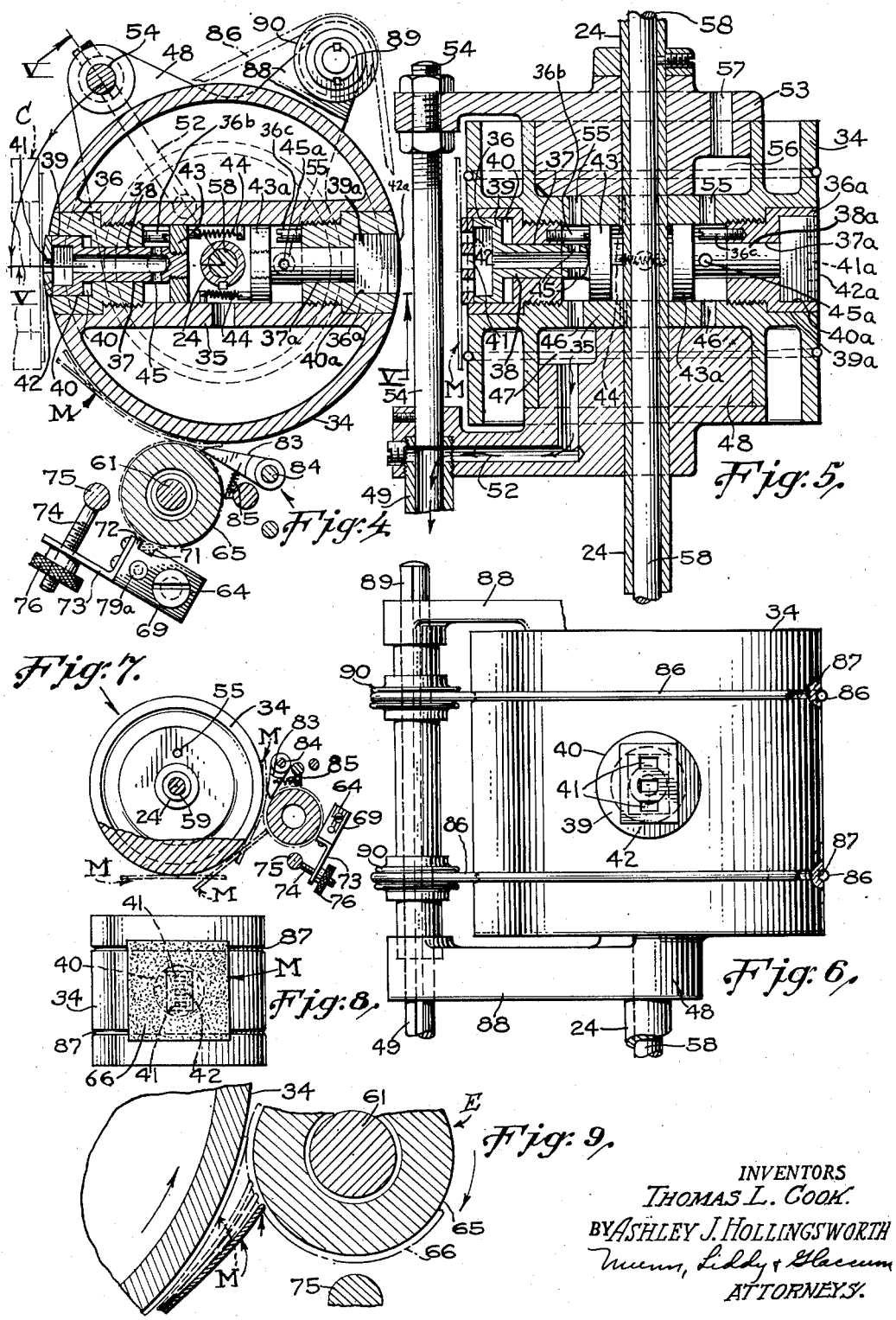

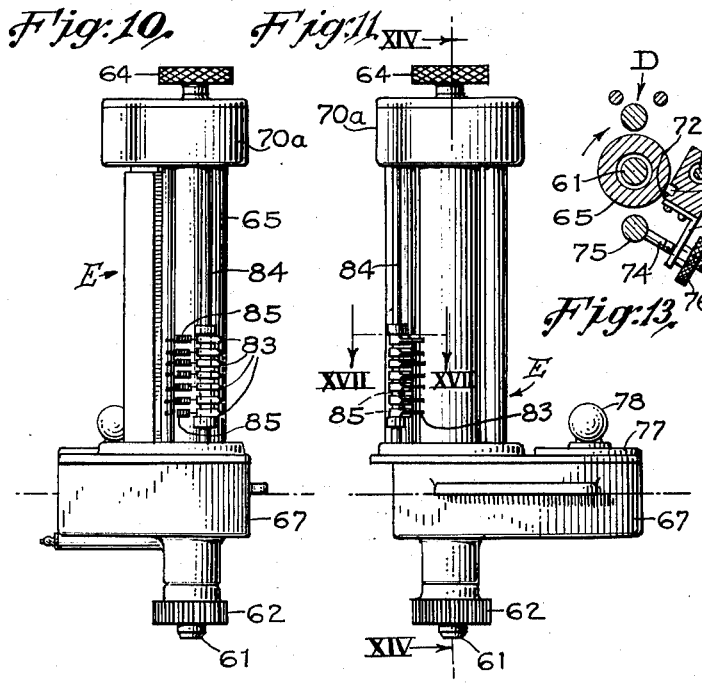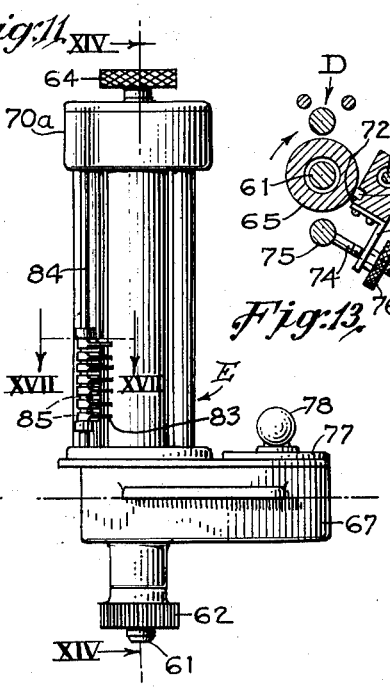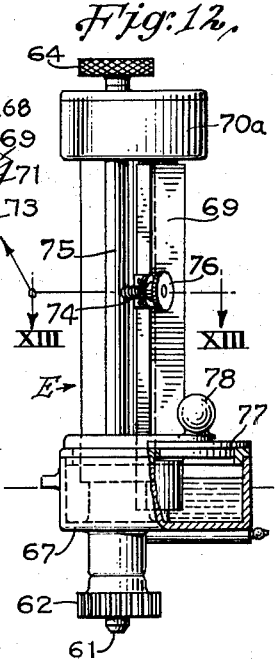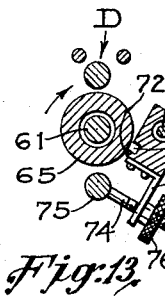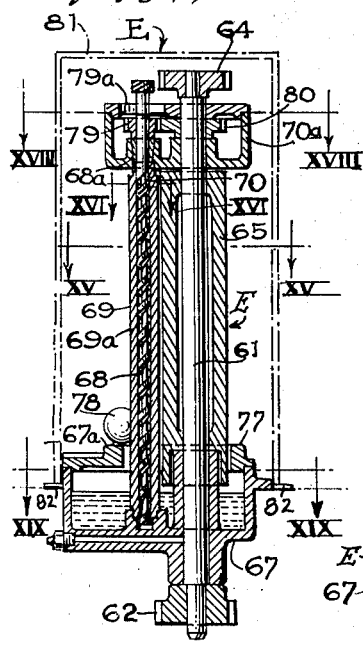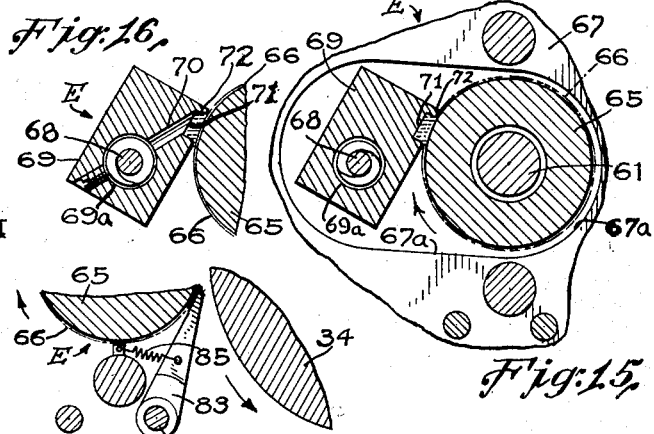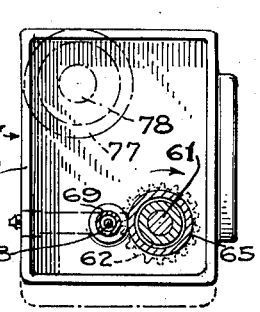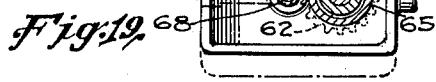

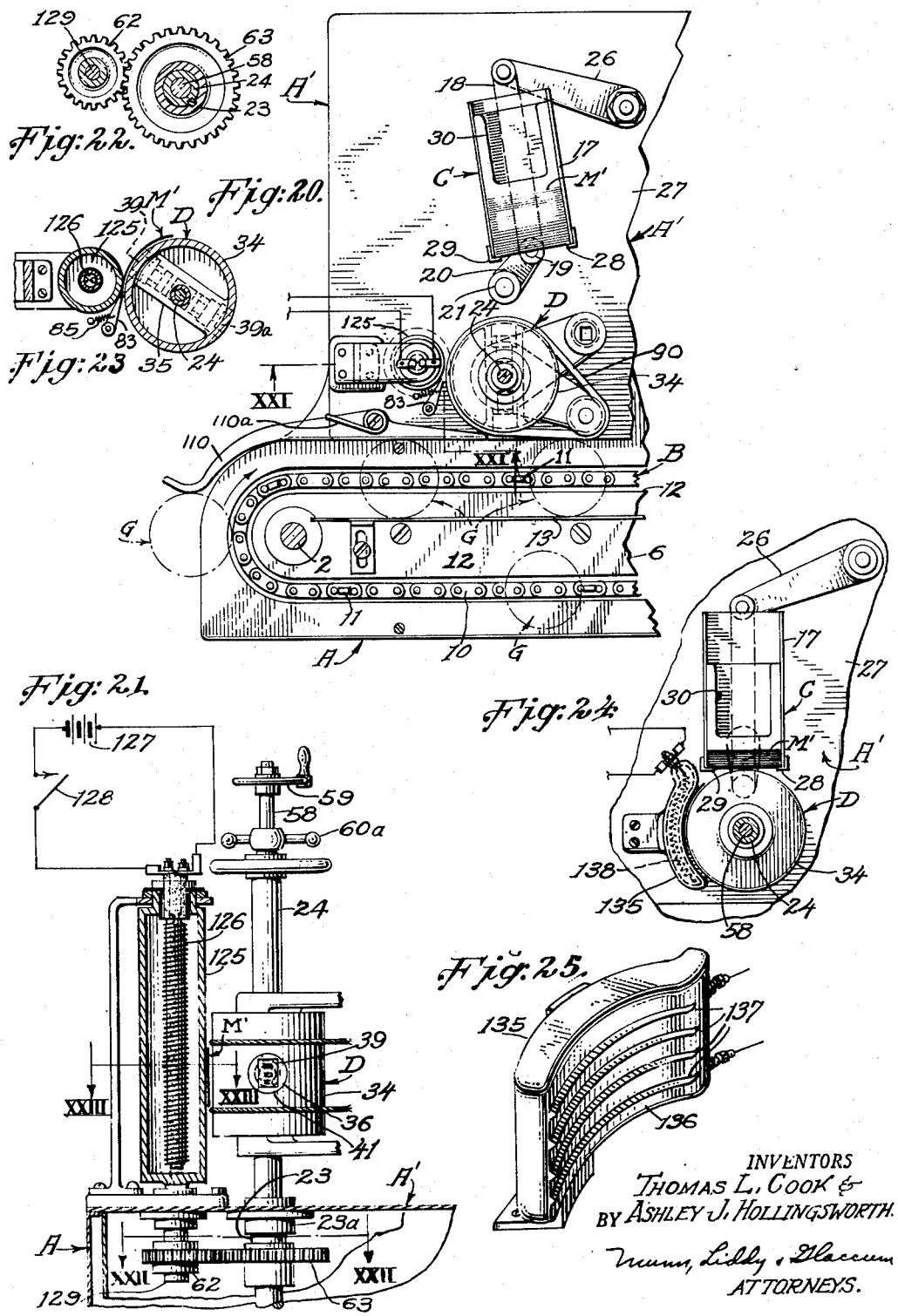

Patented Apr. 21, 1953

2,635,776

UNITED STATES PATENT OFFICE 2,635,776

MACHINE FOR APPLYING LABELS TO THE SIDES OF ARTICLES AS THEY ARE MOVED ON THEIR ENDS THROUGH THE MACHINE

Thomas L. Cook and Ashley J. Hollingsworth, San Francisco, Calif.; said Hollingsworth assignor to said Cook Application March 24, 1950, Serial No. 151,798

2 Claims. (Cl. 216—55)

An object of our invention is to provide a label-applying machine of the type mentioned which is continuous in operation and in which a glue-applying roller for the label is placed in an upright position and the labels are also in an upright position so that the containers to which the labels are secured, may remain in an upright position while passing through the machine.

The labels are disposed in an upright position in a label-receiving magazine and a free moving presser head placed in the magazine, urges the pack of labels toward a suction head during the initial contact of the outermost label with the head so as to increase the pressure of contact, and then the presser head releases the pressure against the pack of labels at the time the suction head actually picks off the outermost label. There is no complete stopping of the movement of the suction head or the label magazine during the removal of a label by the suction head. The two move in synchrony with each other.

A further object of our invention is to provide a device of the type described in which the suction or vacuum head does not touch the glue roller if a label is not carried by the head. An air tight cover is placed over the glue roller when the machine is not used and prevents the glue or other adhesive from drying out. A label-heating roller or a shoe may be substituted for the adhesive-applying roller when labels with a coating of bondable plastic are used.

A label-pressing mechanism presses the labels on the containers after the labels have been applied by the suction head to the containers and the label-pressing means moves at the same speed as the containers during the actual pressing operation. It is possible to position the label-pressing means so as to accommodate containers of different sizes.

Other objects and advantages will appear in the following specification, and the novel features of the device will be particularly pointed out in the appended claims.

Our invention is illustrated in the accompanying drawings forming a part of this application, in which:

Figure 1 is a top plan view of the device;

Figure 2 is a horizontal section taken along the line II—II of Figure 3;

Figure 2a is an enlarged horizontal section through a portion of the device, and is taken along the line IIa—IIa of Figure 3;

Figure 3 is a vertical section taken along the line III—III of Figure 1;

Figure 4 is an enlarged horizontal section taken along the line IV—IV of Figure 3 and shows the double suction head;

Figure 5 is a vertical section through the double suction head and is taken along the line V—V of Figure 4;

Figure 6 is a side elevation of the double suction head;

Figure 7 is a diagrammatic plan view of the suction head illustrating a label on the head and approaching a gluing roller;

Figure 8 is a side elevation of the suction head on a smaller scale than that shown in Figure 6 and illustrates the head supporting a label;

Figure 9 is a greatly enlarged view of a portion of the suction head in horizontal cross section and a portion of the gluing roller also in section and illustrates how the label edge is picked up by the roller;

Figure 10 is a side elevation of the gluing roller;

Figure 11 is a front elevation of the gluing roller;

Figure 12 is a side view of the gluing roller when looking from the opposite side from that shown in Figure 10, a portion of the glue container being shown in section;

Figure 13 is a horizontal section of the gluing roller and associate parts and is taken along the line XIII—XIII of Figure 12;

Figure 14 is a vertical section of the gluing roller and associate parts and is taken along the line XIV—XIV of Figure 11;

Figure 15 is an enlarged horizontal section of the gluing roller and associate parts and is taken along the line XV—XV of Figure 14;

Figure 16 is an enlarged horizontal section of the gluing roller and associate parts, showing the glue inlet end, and is taken along the line XVI—XVI of Figure 14;

Figure 17 is an enlarged horizontal section of a portion of the gluing mechanism and is taken along the line XVII—XVII of Figure 11, and illustrates the fingers used for preventing the label from adhering to the glue roller;

Figure 18 is a horizontal section taken along the line XVIII—XVIII of Figure 14, and illustrates the gearing mechanism between the gluing roller and the glue feeding auger;

Figure 19 is a horizontal section through the glue compartment and is taken along the line XIX—XIX of Figure 14;

Figure 20 is a top plan view of a portion of Figure 1, and substitutes a label-heating roller for a gluing roller;

Figure 21 is a vertical section taken along the line XXI—XXI of Figure 20;

Figures 22 and 23 are horizontal sections taken along the lines XXII—XXII and XXIII—XXIII of Figure 21, respectively;

Figure 24 shows a portion of Figure 20, and substitutes a label-heating shoe rather than the roller; and Figure 25 is an enlarged perspective view of the label-heating shoe.

While we have shown only the preferred forms of our invention, it should be understood that various changes or modifications may be made within the scope of the appended claims without departing from the spirit and scope of the invention.

In carrying out our invention, we provide a casing indicated generally at A in Figure 3. This casing may be portable, if desired, and we have shown it mounted upon rollers 1. Within the casing we mount the various units for operating the container conveying mechanism indicated generally at B. In the top plan view of Figure 1, we show a label-feeding magazine C, a label applying mechanism D, an adhesive feeding mechanism E for the labels, and a pressure applying mechanism indicated generally at F, this latter mechanism pressing the labels firmly against the containers to cause them to adhere. All of these mechanisms will be explained in detail in the order named and it should be noted that they will operate on the containers while the latter are continually moving from the entrance end of the conveyor to the exit end so as not to interfere with the continuous movement of the containers.

Container conveying mechanism

Reference to Figures 1, 2 and 3 shows the container conveying mechanism comprising a drive shaft 2, see Figure 1, and a driven shaft 3. Lower and upper sprockets 4 and 5 are mounted on the drive shaft 2, see Figure 3. The sprocket 4 is placed under a platform 6 on which the containers G are adapted to slide while being supported. The upper sprocket 5 may be adjusted on the shaft 2 to accommodate containers of different heights.

The driven shaft 3 has an upper sprocket 7, see Figure 1, that is operatively connected to the sprocket 5 by means of a sprocket chain 8. The chain may be provided with depending fingers 9, see Figure 3, that are designed to engage with the tops of the containers for moving them along the platform. The lower drive sprocket 4 shown in Figures 2 and 3 has a sprocket chain 10 passed therearound and this chain is also passed around a lower sprocket 4a which is mounted on the driven shaft 3 and in the same horizontal plane as the sprocket 4. The chain 10 has upwardly extending container-contacting fingers 11 that are slidably received in slots 12 provided in the platform 6. The fingers 11 contact the lower portions of the containers G and move them along the platform 6. The containers slidably contact an adjustable guide plate 13 that extends upwardly from the plate 6 and is designed to extend from the shaft 2 to the shaft 3, see Figure 1.

The containers G may be fed on to the platform from the left hand end thereof as shown in Figure 1 by any means desired. We have indicated a star wheel J for feeding the containers, but we do not wish to be limited to any particular container-feeding mechanism. The shafts 2 and 3 rotate in a clockwise direction when looking at Figure 1 and the containers are continuously moved from the left hand end of the guide 13 to the right hand end during the application of the labels to the containers.

Before describing the label feeding mechanism, it is best to set forth the mechanism for rotating the drive shaft 2 for the endless conveyor B. In Figures 2 and 3 it will be noted that we provide a motor K and this motor is connected to a reduction gear mechanism indicated generally at L and the latter is operatively connected to the drive shaft 2 by any means desired, such as by a chain and sprockets indicated generally at 14. A door 15 is hinged to the casing A and when the door is swung into open position, access may be had to the motor K, reduction gearing L and the sprocket chain 14.

Label feeding mechanism

The label feeding mechanism is indicated generally at C in both Figures 1 and 3. A magazine 17 for receiving labels M is mounted on a link 18. The link in turn has the end disposed nearest the platform 6 pivotally connected at 19 to a crank arm 20. The crank arm in turn is mounted on a stub shaft 21, see Figure 3, and the latter is connected by means of a chain and sprockets 25 to the drive shaft 2. Both Figures 2 and 3 show the sprocket chain passed around a spring-pressed idler 25a that takes up slack in the chain. The purpose of this will be set forth hereinafter. The other end of the link 18 is mounted on an oscillatable arm 26, see Figure 3. The arm in turn is pivotally connected to the top plate 27 of a housing A'. The crank arm 20 is rotated in a clockwise direction when looking at Figure 1.

The label magazine 17 has an open end 28, see Figure 1, and the side walls of the magazine have flanges 29 defining the sides of the open end. The outer label of the group of labels M is pressed against the flanges. A weight 30 is placed in the magazine 17 and is freely movable therein so as to bear against the rearmost label and force the label group toward the open end 28. We have found from actual experience that the particular movements of the crank arm 20, the link 18, and the oscillating arm 26 will cause the weight 30 to exert its greatest force against the pack of labels at the time when the outermost label is being removed from the magazine by the label-applying mechanism D. This force is exerted when the magazine 17 is substantially in its furthest position toward the conveyor end of the machine and when the suction head, hereinafter described, is in contact with the outermost label.

As the throw of the crank arm 20 moves the magazine 17 away from the suction head, the force of the weight exerted against the back of the labels will be lessened due to the particular clockwise rotation of the crank arm 20 and the oscillating movement of the arm 26. The forward movement of the weight against the back of the labels is greater than the movement of the weight away from them and this results in the weight moving forwardly in the magazine in a progressive manner so as always to apply pressure against the back of the pack of labels at the time a label is being removed. In this way we obviate any need for using a spring-pressed plate for urging the pack of labels toward the forward end of the magazine as these labels are removed one at a time by the suction head. The label magazine 17 is removably mounted on the link 18. Figure 3 shows the magazine as having a projection 31 that is received in a socket 32 formed on the upper surface of the link 18. The magazine 17 also has a depending saddle 33 that receives a portion of the link, the saddle having a grooved under surface in which the link is received.

Label-applying mechanism

The label-applying mechanism D comprises a cylindrical-shaped double suction head and the cylindrical casing 34 thereof is shown on a larger scale in Figure 4. In the vertical section of Figure 5 it will be seen that the casing 34 is rigidly mounted on a vertically slidable hollow shaft 24 which may be termed a torque tube. Figures 2a and 3 illustrate the hollow shaft 24 as receiving a threaded shaft 58. A nut 24a is secured to the lower end of the shaft 24 and is threaded upon the shaft 58. The lower end of the shaft 58 is rotatably supported by a bearing 58a which can slide over the bottom of the casing A for a purpose hereinafter described. An outer hollow drive shaft 23 receives the shaft 24 and is keyed thereto, see Figure 2a, so that a rotation of the shaft 23 will rotate the shaft 24 and with it the casing 34.

Figure 3 shows the hollow drive shaft 23 extending through a horizontally-movable housing A1 and carried thereby by bearings 23a. The purpose of the housing A1 will be described later. The shaft 23 is rotated at one-half the speed of the shaft 21 and obtains its power from the shaft 21, through the medium of a small gear 22 keyed to the shaft 21 and meshing with a large gear 22a, keyed to the hollow shaft 23. The shaft 23 permits vertical movement of the shaft 24 for adjusting the height of the label-applying head D with respect to the containers G. The purpose of this will be explained more in detail hereinafter. Sufficient to say at present that a hand wheel 59 is mounted at the top of the threaded shaft 58 and may be rotated for raising or lowering the head D. A manually actuated lock nut 60a, see Figure 3, is mounted on the shaft 58 above the top of the hollow shaft 24. After the head D has been raised or lowered by rotating the hand wheel 59 in the desired direction, the nut 60a can be tightened down upon the shaft 24 for connecting it to the shaft 58 as a unit. Both will rotate as a unit during the operation of the machine.

We will now describe the structure of the double-suction head casing 34. A transversely extending cylinder 35, see Figure 4, extends diametrically across the cylindrical casing 34 and has bearing members 36 and 36a mounted at the ends thereof. Each bearing member has a passage 37 and 37a, respectively, for slidably receiving a hollow piston rod 38 and 38a. The piston rods 38 and 38a have enlarged heads 39 and 39a, respectively, received in enlarged cavities 40 and 40a, and these cavities extend to the outer periphery of the cylindrical casing 34. The heads 39 and 39a are hollow and communicate with the hollow piston rods 38 and 38a. The outer end of each head is perforated at 41 and 41a, respectively, and the outer surfaces of the heads are made arcuate and have the same radius as the radius of the cylindrical casing. When the head 39 is in its innermost position within the cavity 40, the arcuate outer surface 42 of the head will be a continuation of the cylindrical surface 34. The head 39a has its outer surface 42a similarly shaped.

The hollow piston rods 38 and 38a have pistons 43 and 43a mounted at their inner ends with the pistons being slidably received in the transverse cylinder 35. In the double suction head, the pistons 43 and 43a are urged toward each other and toward the center of the cylinder casing by coil springs 44 that are connected to both pistons.

We make use of a vacuum for automatically moving the hollow head 39 or 39a outwardly when a label M is received by either head and closes the openings in the head. Figure 5 shows the hollow piston rods 38 and 38a provided with openings 45 and 45a that place the interior of the rods in communication with the interior of the transverse cylinder 35. In Figure 5, the left hand hollow piston rod 38 has its openings 45 communicating with the interior of the cylinder 35 and this cylinder has an opening 46 that communicates with a suction chamber 47. The suction chamber is formed in a lower stationary valve head 48 that rotatably receives the cylindrical casing 34 and is rigidly secured to a suction pipe 49 and therefore the head is held against rotation. Figure 3 shows the suction pipe 49 extending through the top 27 of the housing A' and connected to a suction pump N by means of a flexible conduit 50. A vacuum release valve 51 is placed on the pipe 49 for a purpose hereinafter described.

The lower stationary valve head 48 has a suction passage 52 that places the pipe 49 in communication with the suction chamber 47. The suction chamber is large enough to apply a continuous suction to the portion of the cylinder 35 that houses the hollow piston rod 38, during a half circle rotation of the suction head. By this we mean that the rotation of the cylindrical casing 34 through one-half a circle will move the opening 46 of the cylinder 35 from one end to the opposite end of the suction chamber 47, so that the suction produced in the chamber 47 will also be carried into the portion of the cylinder 35 disposed between the piston 43 and the bearing 36. This suction in the cylinder portion will move the piston 43 to the left in Figure 5 to project the surface 42 beyond the casing 34 when a label M closes the openings 41 and prevents atmospheric air from relieving the vacuum. The label will therefore be spaced from the cylindrical wall of the casing 34 by the head 39 and this operation will be automatic.

The top of the casing or casting 34 rotatably receives a stationary upper valve head 53. This head is carried by a rod 54 that is axially aligned with the suction pipe 49 and is secured to a projection on the lower stationary valve head 48 so that the two heads will act as upper and lower stationary valve heads for the suction mechanism. It will be noted that when the left hand suction opening 46 is in communication with the left hand portion of the cylinder 35, when looking at Figure 5, a right hand opening 55 in the other half of the cylinder 35 will register with the space in the right hand end of the cylinder 35 defined by the piston 43a and the right hand bearing 36a. Any vacuum in this right hand portion of the cylinder 35 will be relieved because the right hand opening 55 communicates therewith and this opening also communicates with a compartment or header 56 which is similar to the suction compartment or header 47, but is in communication with the atmosphere through an opening 57.

From the structure thus far set forth, it will be apparent that each half of the cylinder 35 will be successively brought into communication with the suction compartment 47 of the valve or header 48 during a rotation of about 180° of the casing 34 with the cylinder 35 and then will be brought into communication with the atmosphere through the remaining 180° of rotation.

Both cylinder halves will therefore be provided with right and left hand openings 46 and with right and left hand release openings 55. The purpose of this will be made clear as the operation of the machine is described. If no label is placed over the openings 41 and 41a in each head 39 and 39a, respectively, the springs 44 will retract the head so that its outer surface 42 or 42a will form a continuation of the outer cylindrical surface of the casing 34.

It is possible to adjust the casing 34 vertically so as to elevate or lower the positions of the heads 39 and 39a with respect to the containers G, see Figure 3. The screw shaft 58 has its lower end rotatably received in the bearing 58a. The upper end of the threaded shaft 58 projects above the slidable shaft 24 and is provided with the hand wheel 59. The rotation of the hand wheel will rotate the shaft 58 and will raise or lower the slidable shaft 24. The result is a raising or lowering of the casing 34. It will also be seen from Figure 3 that the top of the slidable hollow shaft 24 is provided with a hand wheel 60 by means of which the casing 34 may be manually rotated into the desired position. Manual rotation may be resorted to when checking the initial removal of the label M from the magazine 17 and the applying of the label to a container G.

During the operation of the machine, the threaded shaft 58 rotates with the shaft 23 and the bearing 58a rotatably supports the shaft. We mount the lock nut 60a on the threaded shaft 58 above the top of the shaft 23. This nut has diametrically extending handles by means of which the nut may be rotated and locked against the top of the shaft 24 for securing this shaft to the threaded shaft 58 as a unit.

Adhesive applying mechanism

We provide novel means for applying glue or other adhesive automatically to the label M as it is carried from the label magazine C to the container G where the label is to be applied. In Figure 4 we indicate the relative position of the adhesive applying mechanism with relation to the suction head casing 34. Figures 7 and 9 to 19, inclusive, illustrate the adhesive applying mechanism E.

Referring to Figure 14, it will be seen that we provide a vertical spindle 61 that has a gear 62 mounted at its lower end. This gear is in mesh with a large gear 63, see Figures 2 and 3, that is mounted on the hollow shaft 23 so as to be rotated thereby. A knurled knob 64 is mounted at the top of the spindle or vertical shaft 61. An adhesive carrying drum or roller 65 is mounted on the shaft 61 so as to be disposed in a vertical position. Figure 15 shows a horizontal section through the drum 65 on a larger scale and the drum or roller is caused to rotate in a clockwise direction when looking at this figure. The adhesive 66 is carried in a reservoir 67 and an auger 68 extends down into the reservoir and cooperates with a tubular passage in a casing 69 for providing a vertical conveyor for lifting the adhesive from the reservoir. Figure 14 shows the casing 69 provided with a radially-extending outlet 70 near its top and this outlet is illustrated on a larger scale in Figure 16. The auger 68 lifts the adhesive through the vertical bore 69a that snugly receives the auger so that the adhesive is lifted and delivered to the outlet passage 70.

Referring to Figure 16, it will be seen that the outlet 70 communicates with a vertical groove 71 provided in the casing 69 and this groove parallels the outer surface of the roller 65. The adhesive will flow downwardly along the groove 71 in sufficient quantity to contact with the outer surfaces of the roller 65 and thus supply an even film of adhesive from the top to the bottom of the roller. Any excess glue will find its way back into the reservoir 67 through the opening 67a in the reservoir top where it can again be lifted by the auger 68.

The casing 69 for the auger has a lip 72 that acts as a film depth regulator for determing the depth of the film of adhesive applied to the roller. It is possible to rock the casing 69 about the axis of the auger 68 as a pivot and move the film regulating lip 72 the desired distance from the outer surface of the roller. In Figure 13 we show the auger casing 69 provided with a forked finger 73 that straddles a stud 74 that extends from an upright 75. A knurled nut 76 is mounted on the threaded stud 74 and may be adjusted for swinging the casing 69 and thus position the lip 72 the desired distance from the outer surface of the roller 65.

The reservoir 67, see Figure 12, has a removable cover 77 and the cover carries a handle 78. The auger 68 is rotated by the shaft 61 through the two top gears 79 and 80 that mesh with each other and are mounted on the auger shaft and on the shaft 61, respectively. The auger 68 has a tapered sleeve 68a rotatably received in a tapered bearing, see Figure 14, and the gear 79 is positioned just above the sleeve. A housing 79a encloses the gears 79 and 80 and it has an opening 79a large enough for permitting the auger 68 to be withdrawn for cleaning. The auger shaft projects above the gear 79 and is provided with a knob that extends above the opening 79a to facilitate the withdrawal of the auger for inspection and cleaning.

When the machine is not being used, a hermetically-tight casing 81 is placed over the roller 65 and the auger 68 and has its lower end resting on a gasket 82, see Figure 14, so that no air can enter the casing or hood 81. This prevents the adhesive from drying out between operating periods.

We provide fingers 83 for removing the labels from the outer surface of the roller 65 and these fingers are shown in Figures 10, 11 and 17. Each finger 83 is swingably mounted on a vertical rod 84 and a spring 85 yieldingly holds the pointed end of the finger against the glue roller 65. As the label M is carried past the adhesive applying roller 65 by the suction head casing 34, the springs 85 keep the fingers 83 in contact with the outer surface of the roller 65 so as to free the label from the roller. The particular manner of accomplishing this is clearly shown in Figure 4. In Figure 8 we illustrate how the entire label M is applied with adhesive 66. The fact that the center of the label is applied with adhesive is due to the fact that the suction head 39 holds the label away from the outer surface of the cylinder 34 and in a position where the center portion will contact with the adhesive applying roller.

Figure 7 illustrates how the label M will have a tendency to remain in a flat plane while it is being carried around by the suction head casing 34. Therefore, the advancing edge of the label will be the first to strike the adhesive roller and this is shown diagrammatically and on a larger scale in Figure 9. Since the roller 65 in Figure 9 is rotating in a clockwise direction and the suction head casing 34 is rotating in a counter-clockwise direction, the leading edge of the label M will be forced in between the casing 34 and roller 65. The adhesive film on the roller 65 will act as a "gear" to pull the forward end of the label into proper position in between the casing and the roller. The film or adhesive on the roller 65 will not contact with the outer surface of the revolving casing 34 at any time and this is clearly illustrated in Figure 9.

As soon as the advancing edge of the label passes between the adhesive roller 65 and the suction head casing 34, the fingers 83 will remove the label from the roller 65 as shown in Figure 4. We make use of a number of fingers 83 and this is clearly shown in Figures 10 and 11. When the label is carried on to the container G for application thereto after the label has received its film of adhesive, we provide a simple means for aiding in removing the label from the casing 34 and in applying it to the container. This means comprises two endless bands 86, see Figure 6, that are received in spaced grooves 87 provided in the outer surface of the casing 34. The stationary valve heads 48 and 53 carry integral arms 88 and these arms support a spindle 89. Freely rotating pulleys 90 are mounted on the spindle 89.

Figure 1 shows the position of these pulleys so as to cause a portion of the bands 86 to extend parallel with the container conveying chain B. The endless bands 86 will be passed around the casing 34 and around the pulleys 90 and their purpose is to cause the forward end of the label to move in a plane parallel with the movement of the container during the application of the labels to the containers. A large area of the label is forced against the container G, by the head 39, but thus far the label applying means does not curve the ends of the label against the outer surface of the container.

The pressure applicating mechanism indicated generally at F in Figure 1 accomplishes this feature. One or more arcuate-shaped label-pressing members 91 and 92 may be used. The member 91 is carried by an arm 93 which in turn is pivotally carried by links 94 and 95. The other label pressing member 92 is carried by an arm 96 that is also connected to the other ends of the same links 94 and 95. The center of each link 94 and 95 is pivotally mounted at 97 and 98, respectively, to rotating discs 99 and 100. These discs are mounted on shafts 101 and 102. Reference to Figure 2 shows the shafts 101 and 102 connected to the main drive rotatable sleeve 23 by means of a chain and sprocket indicated generally at 103. The timing of the movement of the label-pressing members 91 and 92 is such that they will move in the general direction of the moving containers G during the actual pressing of the labels on to the containers, and while the containers are being moved by the conveyor B.

Coil springs 104 and 105 yieldingly hold the label-pressing members in contact with the containers G during the time the members 91 and 92 are held in contact with the containers. The rotating discs 99 and 100 and the eccentric mounting of the links 94 and 95 on the discs will cause the label-pressing members to swing in a circle whose arc portions will be substantially tangent to the line of movement of the containers. The slight variation between the arcuate movement of the label-pressing members and the straight movement of the containers G during the actual contact between the two will be compensated for by the springs 104 and 105.

Before starting the machine to operating, the label-applying head D should be adjusted toward or away from the conveyor B to position the head in proper relation to the containers G. The size of the containers to be labelled determines the position of the head D. Figures 2 and 3 show the movable housing A' supported on slides 16. A screw shaft 106 extends through a wall 107 of the casing A and is threaded into a threaded bearing 108 carried by the movable housing A'. A rotation of a hand wheel 109 will rotate the shaft and move the housing A' toward or away from the conveyor B. The housing carries with it the label-applying mechanism D and moves it toward or away from the conveyor B. The shaft 58 moves with the mechanism D and so does likewise the bearing 58a. The spring-pressed idler 25a keeps the sprocket chain 25 taut as the adjustment is made.

The vertical adjustment of the mechanism D is then made to position the label at the desired height on the container. The lock nut 60a is first loosened and then the hand wheel 59, see Figure 3, is rotated in the desired direction for raising or lowering the shaft 24 and with it the mechanism D. The magazine C is next provided with a supply of labels M and the machine is ready for operation.

The motor K is now connected to a source of current by the closing of a switch, not shown. The motor not only operates the device, but it also actuates the pump N which applies a vacuum through the flexible hose 50 and suction pipe 49. The pipe 49 has the vacuum release valve 51 therein and when the valve is closed, a suction or vacuum will be created in the suction chamber 47, see Figure 5. Air will therefore be sucked into the openings 41 just as the piston head arcuate surface 42 and the outermost label M in the pack of labels in the magazine C are brought into contact with each other. The crank arm 20 will be moving the feed end of the magazine C in substantially the same direction as is taken by the piston head arcuate surface 42. The arcs of the two circles described by the crank arm 20 and the piston head arcuate surface 42 will be tangent at the point where the head contacts the outermost label in the magazine.

At this moment the weight 30 will be pressing against the back of the pack of labels so as to cause the outermost label to make good contact with the piston head arcuate surface 42. The label will be sucked against the head arcuate surface 42 and will act as a valve for closing the openings 41 in the piston head 39 and as soon as air cannot enter the passageway 37 to relieve the vacuum, the force of the vacuum will immediately act on the piston 43 to move it to the left in Figure 5 against the tension of the spring 44 and cause the arcuate outer surface 42 of the piston head 39 to project beyond the outer surface of the cylindrical casing 34 a predetermined distance. Adjustable set screws 36b and 36c are received in threaded bores in the inner ends of the bearing members 36 and 36a, respectively. The piston 43 and 43a abut these screws when the vacuum actuates the pistons due to the closing of the openings 41 or 41a by a label.

The adjustment of the stop screws 36b and 36c is such as to cause the suction heads 39 and 39a to be extended a fixed distance beyond the cylindrical surface of the casing 34 and to carry the labels M past the adhesive roller 65 where a layer of adhesive will be applied to the entire label surface. The surface of the casing 34 is spaced from the layer of adhesive on the roller 65 and so is likewise the suction head 39 or 39a when no label is carried by either head.

The timing of the device is such that the suction head with its label M will reach the portion of the conveyor B just as a container G is brought into position. As soon as the label is pressed against the container, the passage 55, see Figure 5, associated with the piston 43, will reach the compartment 56 and the air will rush in to relieve the vacuum and free the label from adhering to the suction head. The application of suction to the two heads 39 and 39a is automatically accomplished and relieved at the proper time intervals to remove labels one at a time from the pack of labels and to apply them to the containers. Two labels are removed for each revolution of the casing 34.

If for any reason a container G should not be fed into the conveyor to receive a label, we provide novel means for cutting of the suction so no label will be picked up by the suction head that is to apply the label to the container. In Figure 1 a lever 110 is shown placed at the entrance to the conveyor B. A torsional spring 110a, see Figure 20, yieldingly holds the lever nearer the sprocket chain 8 than necessary to permit a container to pass between the lever and the chain. The lever is mounted on a shaft 111, see also Figure 2, and the shaft has an arm 112 connected thereto which in turn is connected by a link 113 to a valve actuating arm 114. The arm 114 holds the vacuum release valve 51 open so long as no containers enter the conveyor and therefore no vacuum can reach the suction heads to remove labels from the pack of labels in the magazine C.

As soon as a container does enter the conveyor B, the control lever 110 will be swung and through the shaft 111, arm 112, link 113 and arm 114, will actuate the latter for closing the vacuum release valve 51. The result will be the applying of a vacuum to the suction heads at the proper time for removing labels from the label magazine.

After the label is applied to the container, the pressure applicators F will press the label to the container for causing it to adhere thereto. The movement of the container is not halted or interfered with in any manner while the pressure applicators are performing their function.

We have already explained how the adhesive is applied to the roller 65 and how the fingers 83 remove the label from the roller or drum. When the machine ceases to operate, the cover 81 can be placed over the drum 65 and associate parts to make an hermetic seal. The adhesive is prevented from drying out.

It is possible for the label applying machine to be used with labels that have a layer of bondable plastic applied thereto. The plastic is of such a nature that when it is heated it will act as an adhesive and cause the label to become attached to any surface against which the label is pressed. In Figures 20 to 23 inclusive, we show a slight modification of the machine in which the adhesive applying roller 65 can be dispensed with and in lieu thereof, heated roller 125 is used, see Figure 21. The roller 125 is placed adjacent to the cylindrical casing 34 of the label-applying mechanism D and the suction heads 39 and 39a will remove labels M' from the label receiving magazine 17. The magazine and its associated mechanism for moving it in a particular manner are the same as that described in the earlier part of this specification. The labels M' will have layers of bondable plastic material applied thereto and this material will cause the labels to become attached to a surface against which they are pressed if the bonding material is first heated.

Figure 20 illustrates the label-applying mechanism D associated with the label feeding mechanism C for successively removing the labels M' from the magazine and for carrying them past the rotating heated roller 125. The suction heads 39 and 39a will support individual labels, each with its plastic layer facing outwardly so that this layer will be brought into contact with the rotating and heated roller 125. The roller may be heated by any means desired and we have shown a heating element 126 placed within the roller and connectible to a source of current 127 by a switch 128 so that the roller will be heated when the switch is closed.

The means for rotating the roller comprises the gears 62 and 63. The gear 63 is rotated by the hollow shaft 23 and this gear meshes with gearing 62 for rotating the latter at the proper speed. The gear 62 is mounted on a shaft 129 that in turn supports the roller 125. A rotation of the gear 62 and the shaft 129 will cause the roller 125 to rotate.

In the operation of this form of the device, the label M' will be removed from the magazine C and will be carried past the roller 125 so as to contact with its heated surface. The plastic layer on the label is heated, and then the label is carried around by the label-applying mechanism D and is secured to the container G in the same manner as explained for the labels M. The container G is moved by the container conveying mechanism B which has already been described and the timing is such that the label with its heated plastic layer will be brought into contact with the container as the latter is moved by the conveyor.

Figure 22 illustrates the plan view of the two meshing gears 62 and 63, while Figure 23 illustrates the position of the roller 125 with respect to the casing 34 of the label-applying mechanism D. The label M' is shown being passed between the casing 34 and the roller 125 for the purpose of heating the plastic layer. The fingers 83 are yieldingly held against the roller 125 by the springs 85 so as to prevent the label from adhering to the surface of the roller. As soon as the label is applied to the container G, the suction to the suction head 39 or 39a is automatically cut off and therefore the label will adhere to the container. The presser feet F shown in Figure 1, and not shown in Figure 20, are used for pressing the entire surfaces of the labels against the containers.

In Figures 24 and 25 a slightly modified form of label heating means is illustrated. In place of the heated roller 125, we provide a heated shoe 135. The shoe has an arcuate inner face 136, see Figure 25 and this face is provided with arcuate ribs 137. As the label M' after being removed from the magazine C, is carried past the heated shoe 135 by the label-applying mechanism D, the outer surface of the label that has the layer of plastic thereon will be brought into contact with the ribs 137 and slides thereover. These ribs are heated by a heating element 138 that is placed within the hollow shoe 135 and the heated ribs plus the heat radiated by the concave surface 136 will heat the plastic layer on the label. The label applying mechanism D will carry the label from the shoe 135 to a container G, not shown in Figure 24. The container is moved in a continuous manner by the conveyor B and the label will be applied to the container as the latter moves in the manner already described for the labels M. The label is then pressed into intimate contact with the outer surface of the container G by the presser feet F. The heating element 138 in the shoe 135 is connectible to a source of current.

We claim:

1. In a device of the type described; a continuously rotating drum; a cylinder extending diametrically across the drum; a bearing mounted in each end of the cylinder; a hollow suction head slidably mounted in each bearing and having a perforated end normally lying flush with the outer periphery of the drum; each head having a hollow piston rod integral therewith; a piston mounted at the inner end of each rod and spaced from its bearing; a stationary header for the drum and having a suction compartment; said cylinder having two openings, each one communicating with the space between one of the pistons and the adjacent bearing; said hollow piston rods having openings communicating with the same spaces; said cylinder openings being alternately brought into communication with the suction compartment in the header as the drum revolves; and a second stationary header for the drum and having a compartment communicating with the atmosphere; said cylinder having two additional openings, each one communicating with the aforementioned space formed between one of the pistons and the adjacent bearing; said last-named cylinder openings being alternately brought into communication with the compartment in the second header communicating with the atmosphere as the drum revolves; the arrangement being such that each of said spaces is alternately placed under suction and then vented to the atmosphere for each revolution of the drum; the suction being such that when a label closes the openings in the perforated end of a suction head, the piston associated with the head is moved for projecting the perforated end and label beyond the drum periphery.

2. In a device of the type described; a continuously rotating drum; a cylinder extending diametrically across the drum; a bearing mounted in each end of the cylinder; a hollow suction head slidably mounted in each bearing and having a perforated end normally lying flush with the outer periphery of the drum; each head having a hollow piston rod integral therewith; a piston mounted at the inner end of each rod and spaced from its bearing; a stationary header for the drum and having a suction compartment; said cylinder having two openings, each one communicating with the space between one of the pistons and the adjacent bearing; said hollow piston rods having openings communicating with the same spaces; said cylinder openings being alternately brought into communication with the suction compartment in the header as the drum revolves; a second stationary header for the drum and having a compartment communicating with the atmosphere; said cylinder having two additional openings, each one communicating with the aforementioned space formed between one of the pistons and the adjacent bearing; said last-named cylinder openings being alternately brought into communication with the compartment in the second header communicating with the atmosphere as the drum revolves; the arrangement being such that each of said spaces is alternately placed under suction and then vented to the atmosphere for each revolution of the drum; the suction being such that when a label closes the openings in the perforated end of a suction head, the piston associated with the head is moved for projecting the perforated end and label beyond the drum periphery; and adjustable stops for limiting the outward movement of the suction heads when supporting a label.

THOMAS L. COOK.
ASHLEY J. HOLLINGSWORTH.

References Cited in the file of this patent

UNITED STATES PATENTS

| Number | Name | Date |
| --- | --- | --- |
| 1,641,045 | Oslund et al. | Aug. 30, 1927 |
| 1,774,502 | Boulton | Sept. 2, 1930 |
| 1,790,594 | Oslund | Jan. 27, 1931 |
| 2,279,844 | Smith et al. | Apr. 14, 1942 |
| 2,341,521 | Baker et al. | Feb. 15, 1944 |
| 2,352,720 | Knowlton | July 4, 1944 |
| 2,391,694 | Everett | Dec. 25, 1945 |
| 2,449,298 | Hoppe | Sept. 14, 1948 |
| 2,495,174 | McClatchie | Jan. 17, 1950 |
| 2,498,667 | Fischer et al. | Feb. 28, 1950 |
| 2,525,741 | Von Hofe | Oct. 10, 1950 |
| 2,527,272 | Lyon et al. | Oct. 24, 1950 |
| 2,542,282 | Lissimore | Feb. 20, 1951 |
| 2,545,292 | Magnusson | Mar. 13, 1951 |